United States Patent [19]

Young

[11] Patent Number: 6,038,567

[45] Date of Patent: Mar. 14, 2000

[54] METHOD AND SYSTEM FOR PROPAGATING OBJECT PROPERTIES IN A DESKTOP PUBLISHING PROGRAM

[75] Inventor: Kenneth L. Young, Redmond, Wash.

[73] Assignee: Microsoft Corporation, Redmond, Wash.

[21] Appl. No.: 09/025,827

[22] Filed: Feb. 19, 1998

[51] Int. Cl.$^7$ ................................................. G06F 17/30

[52] U.S. Cl. ..................... 707/103; 707/104; 707/514; 707/518; 707/520

[58] Field of Search ..................................... 707/103, 104, 707/514, 515, 518, 520; 395/94

[56] References Cited

U.S. PATENT DOCUMENTS

| | | | |
|---|---|---|---|
| 5,068,809 | 11/1991 | Verhelst et al. | 707/518 |
| 5,181,162 | 1/1993 | Smith et al. | 707/530 |
| 5,214,755 | 5/1993 | Mason | 707/520 |
| 5,535,385 | 7/1996 | Griffin et al. | 707/3 |
| 5,778,402 | 7/1998 | Gipson | 707/530 |
| 5,845,050 | 12/1998 | Sekiguchi | 706/20 |
| 5,895,476 | 4/1999 | Orr et al. | 707/517 |
| 5,895,477 | 4/1999 | Orr et al. | 707/517 |
| 5,900,004 | 5/1999 | Gipson | 707/530 |

*Primary Examiner*—Paul R. Lintz
*Assistant Examiner*—Jean Bolte Fleurantin
*Attorney, Agent, or Firm*—Jones & Askew, LLP

[57] ABSTRACT

A desktop publishing software program configured to propagate object content-defining and format-defining object properties so that user-defined object properties automatically propagate to other objects in the document. Object property propagation allows the author of the document to edit a number of linked objects by editing just one of the objects. To enable object property propagation, the desktop publishing software program includes a propagation table for each predefined layout. Each document is constructed from a number of components, and multiple instances of the same component may occur in a document. Each object has a name including an identifier and an instance code. The desktop publishing software program supports the following object property propagation rules, which may be applied to content properties and format properties separately: (1) do not propagate to any other objects; (2) propagate to objects in the same component whose identifiers belong to the same content or format group; (3) propagate to objects in the same document whose identifiers belong to the same content or format group; (4) propagate to objects in other components of the same document with the same identifiers and instance codes; and (5) propagate to objects in the same document whose identifiers belong to the same content or format group and save the object property in a registry so that the object property propagates to other documents as well.

20 Claims, 8 Drawing Sheets

| 402 OBJECT IDENTIFIER | 404 FORMAT GROUP NAME | 406 CONTENT GROUP NAME |
|---|---|---|
| HEADLINE | HEADS_AND_FOOTS_FMT | HEADLINE_CONTENT ← 408a |
| FOOTER | HEADS_AND_FOOTS_FMT | FOOTER_CONTENT ← 408b |
| ⋮ | ⋮ | ⋮ |

| FORMAT GROUP NAME | OBJECT PROPERTY PROPAGATION CODE |
|---|---|
| HEADS_AND_FOOTS_FMT | 3 ← 416 |
| ⋮ | ⋮ |

| CONTENT GROUP NAME | OBJECT PROPERTY PROPAGATION CODE |
|---|---|
| HEADLINE_CONTENT | 1 ← 426a |
| FOOTER_CONTENT | 3 ← 426b |
| ⋮ | ⋮ |

| PROPAGATION CODE | PROPAGATION RULE |
|---|---|
| 1 | DO NOT PROPAGATE TO ANY OTHER OBJECT |
| 2 | PROPAGATE TO ALL OTHER OBJECTS IN THE SAME COMPONENT WHOSE IDENTIFIERS BELONG TO THE SAME FORMAT/CONTENT GROUP |
| 3 | PROPAGATE TO ALL OTHER OBJECTS IN THE SAME DOCUMENT WHOSE IDENTIFIERS BELONG TO THE SAME FORMAT/CONTENT GROUP |
| 4 | PROPAGATE TO ALL OTHER OBJECTS IN OTHER COMPONENTS OF THE SAME DOCUMENT WITH THE SAME IDENTIFIER AND INSTANCE CODE |
| 5 | PROPAGATE TO OBJECTS IN THE SAME DOCUMENT WHOSE IDENTIFIERS BELONG TO THE SAME CONTENT/FORMAT GROUP AND SAVE THE OBJECT PROPERTY IN A REGISTRY SO THAT THE OBJECT PROPERTY PROPAGATES TO OTHER DOCUMENTS |

FIG. 5

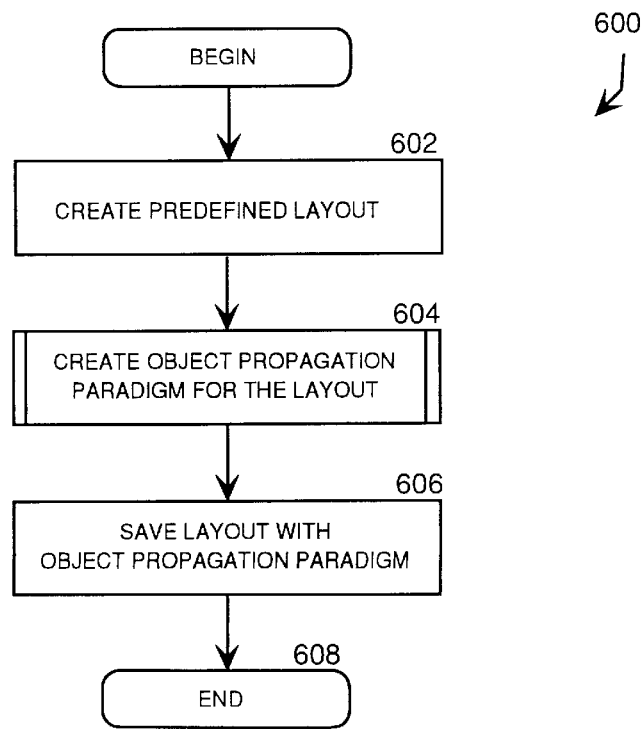

FIG. 6

METHOD AND SYSTEM FOR PROPAGATING OBJECT PROPERTIES IN A DESKTOP PUBLISHING PROGRAM

TECHNICAL FIELD

This invention relates generally to the field of desktop publishing systems and, more particularly, to propagating object properties that define the visible objects of a desktop publishing document.

BACKGROUND OF THE INVENTION

Desktop publishing software programs for personal computers have been available for a number of years. These desktop publishing software programs typically include a number of predefined or "canned" layouts that the desktop publishing software program can render based on specifications received from a user through a high-level interface known as a "wizard." For example, a first predefined layout may be used to create newsletters, a second predefined layout may be used to create sales fliers, a third predefined layout may be used to create wedding invitations, and so forth.

To create a desktop publishing document, the author of the document may select one of the predefined layouts. The wizard then displays a menu-driven utility for the selected layout. The author selects among the options offered by the menu-driven utility to specify the parameters of the layout. Upon receiving an acceptance command from the author, the wizard renders a generic version of the document in accordance with the layout parameters specified through the menu-driven utility. The author may then enter content into the document. The author may also add, delete, and alter the format of the various visible objects of the document. For example, the author may add pictures to the document, change the font of text entries, add headings and footers, and so forth.

The document created by the author with the assistance of the wizard is typically composed of a number of objects. Each object corresponds to a visible element of the document. For a newsletter example, a first object corresponds to the masthead of the newsletter, a second object corresponds to the headline for an article, a third object corresponds to the body of the article, a fourth object corresponds to a picture within the article, a fifth object corresponds to a vertical double-line section divider between the columns of the article, and so forth. Each object includes a number of object properties that define the visible appearance of the object. For example, a first object property specifies the position of the object, a second object property specifies the content of the object, such as text, a third object property specifies the font of the text, a fourth object property specifies the size of the text, and so forth. In this manner, the content and appearance of the document are defined by the object properties of the objects within the document.

After the wizard renders the generic version of the document, the author typically edits and enters content into the layout one object at a time to complete the document. Although the author may want to apply the same format to a number of objects, the author must typically apply the format to each object individually. For example, the user may want to change the font for the headlines in a newsletter that includes several headlines. To do so, the author must change the font for each headline one at a time. Having to perform the same editorial operation for each headline can be tedious and time consuming.

Tedious repetition of editorial changes can also occur with respect to the content of certain objects. For example, the author of a sales flier typically wants identical tear-away tabs along the bottom of the flier. To create the tear-away tabs, the author defines the content for one tab and copies the content to the other tabs. If the author later changes the content of the tear-away tabs, the author must once again define the content for one of the tear-away tabs and then copy the content to the other tabs. Having to copy the content to the other tabs for each change can be tedious and time consuming.

For many predefined layouts, these repetitious editorial changes are often unnecessary. This is because the author of a document using a particular predefined layout almost always wants the format or content of certain groups of objects to be the same. Moreover, the appropriate object property links for a particular layout can usually be ascertained in advance based solely on the intended purpose of the layout. For example, the author of a newsletter almost always wants the same font for all of the headlines. Similarly, the author of a sales flier almost always wants the same content for all of the tear-away tabs that extend along the bottom of the flier.

Linking object properties that define the format and content of a desktop publishing document is complicated by the development environment for typical desktop publishing software programs. In this development environment, the basic desktop publishing software program is typically released with a minimal number of predefined layouts. Additional predefined layouts may be developed by individual software developers using a Software Developer's Kit (SDK) on a layout-by-layout basis. For this reason, the developers of the basic program cannot know what type of object property links will be appropriate for layouts that are developed after release of the basic program.

Prior art desktop publishing software programs typically work with a registry that automatically propagates global parameters, such as the owner's name and business address, to multiple programs and files on the computer system. Because the developers of a basic desktop publishing software program cannot know what type of object property propagation rules will be appropriate for layouts that are developed after release of the basic program, prior art registries are not configured to define different propagation rules for different desktop publishing documents. For this reason, prior art registry systems cannot be used to define object property propagation rules for a variety of predefined layouts for a desktop publishing software program.

Thus, there is a need in the art for a method and system for propagating object properties in a desktop publishing software program. There is a further need for a desktop publishing software program that includes object property propagation rules for a variety of predefined layouts for desktop publishing documents.

SUMMARY OF THE INVENTION

The present invention meets the needs described above in a desktop publishing software program configured to propagate object properties so that a user-defined object property automatically propagates to other objects in a document. Propagating object properties saves the author of a desktop publishing document from the tedious and time consuming task of making the identical editorial changes to a number of objects. For a newsletter example, a user-defined font for one of the headlines automatically propagates to the other headlines in the newsletter. Automatically propagating the headline font saves the author from having to change the font for each headline individually.

The desktop publishing software program allows software developers to define propagation rules for a variety of predefined or "canned" layouts on a layout-by-layout basis. Thus, object property propagation rules that are appropriate for a newsletter may be applied to a newsletter, object property propagation rules that are appropriate for a sales flier may be applied to a sales flier, and so forth. To enable object property propagation, the desktop publishing software program includes at least one table of object property propagation rules. This table may be a global object property propagation rule table that applies to all of the predefined layouts that the desktop publishing program is configured to render.

Alternatively, the desktop publishing program may include a separate object property propagation rule table for each predefined layout. In either case, each object property propagation rule may be disabled on a rule-by-rule basis. For example, an object property propagation rule may be disabled if a command received from the author of a document countermands a previous object property propagation. The desktop publishing software program may also implement other user interface techniques, such as a pop-up user interface that allows the user to enable and disable object property propagation rules on a rule-by-rule basis.

A desktop publishing document is constructed from a number of components in a parent-child container structure. A component is parent-level container object that may include a number of other child objects. Each component is a group of objects that the user would normally consider as a single unit. For example, a frame may be a component that contains child objects including a picture, a legend, a title, and a border. Multiple instances of the same component may occur in the same document, and multiple instances of the same object may occur in the same component. In addition, the desktop publishing program may also be configured to include one or more content and format groups that include a number of object identifiers that may be in different components.

Each object has a name including an identifier and an instance code that uniquely identifies the object within its component. The desktop publishing software program supports the following object property propagation rules, which may be applied to content properties and format properties separately: (1) do not propagate to any other objects; (2) propagate to objects in the same component whose identifiers belong to the same content or format group; (3) propagate to objects in the same document whose identifiers belong to the same content or format group; (4) propagate to objects in other components of the same document with the same identifiers and instance codes; and (5) propagate to objects in the same document whose identifiers belong to the same content or format group and save the object property in a registry so that the object property propagates to other documents as well.

Generally described, the invention is a desktop publishing software program including a number of predefined layouts for various types of documents. For example, a first predefined layout may be used to create newsletters, a second predefined layout may be used to create sales fliers, a third predefined layout may be used to create wedding invitations, and so forth. Each layout includes a predefined set of objects, each object having a user-definable set of object properties for defining a visible element of the desktop publishing document. The desktop publishing software program also includes a propagation rule table that includes a propagation rule for coordinating each object property with a predefined set of other object properties.

The desktop publishing software program receives a layout selection command corresponding to a predefined layout for a document. In response to the layout selection command, the desktop publishing software program selects a predefined layout for the document. The desktop publishing software program receives a publication definition command setting an object property definition for an object property. In response to the publication definition command, the desktop publishing software program retrieves a propagation rule for the object property. The desktop publishing software program then propagates the object property definition for the object property to other object properties in accordance with the propagation rule for the object property.

The desktop publishing software program may also receive a disable command associated with the propagation rule for the object property. In response to the disable command, the desktop publishing software program disables the propagation rule for the object property.

According to an aspect of the invention, each layout also includes a number of components that each include a number of objects that each have an associated identifier and an associated instance code. The desktop publishing software program may propagate the object property definition for the object property by setting an object property definition for a second object property to be the same as the object property definition for a first object property. The desktop publishing software program may then receive a second publication definition command countermanding the propagation of the definition of the first object property to the second object property. In response to the second publication definition command, the desktop publishing software program may disable the propagation rule for the second object property.

According to another aspect of the invention, the propagation rule may include propagating the object property definition for the object property to objects in the same component with the same identifier. The propagation rule may alternatively include propagating the object property definition for the object property to objects in the same document with the same identifiers. In addition, the propagation rule may alternatively include propagating the object property definition for the object property to objects in the same document with the same identifiers and the same instance codes.

According to yet another aspect of the invention, the layout may also include a content group including a number of object identifiers that may be in different components. All of the members of the content group have the same propagation rule for content properties. In this case, retrieving the propagation rule for the object property includes determining whether the object property is a content property. If the object property is a content property, the desktop publishing software program identifies the content group associated with the object. The desktop publishing software program then retrieves the propagation rule for the object property by retrieving the propagation rule for the content group.

Similarly, the layout may include a format group including a number of objects that may be in different components. All of the members of the format group have the same propagation rule for format properties. In this case, retrieving the propagation rule for the object property includes determining whether the object property is a format property. If the object property is a format property, the desktop publishing software program identifies the format group associated with the object. The desktop publishing software program then retrieves the propagation rule for the object property by retrieving the propagation rule for the format group.

For desktop publishing software programs that include content and format groups, the propagation rule for an object property may include no propagation of the object property definition. The propagation rule may alternatively include propagating the object property definition to objects in the same component whose object identifier belong to the same group. The propagation rule may alternatively include propagating the object property definition to objects in the same document whose object identifiers belong to the same group. The propagation rule may alternatively include propagating the object property definition to objects with the same identifiers and the same instance codes in the document. In addition, the propagation rule may include propagating the object property definition to a registry file that sets corresponding object property definitions in other documents.

That the invention improves over the drawbacks of prior desktop publishing software programs and accomplishes the advantages described above will become apparent from the following detailed description of the exemplary embodiments and the appended drawings and claims.

BRIEF DESCRIPTION OF THE DRAWINGS

FIG. 4A illustrates a table of objects having associated format groups and content groups in a desktop publishing software program.

FIG. 4B illustrates a table of object property propagation codes for format groups in a desktop publishing software program.

FIG. 4C illustrates a table of object property propagation codes for content groups in a desktop publishing software program.

FIG. 5 illustrates a table of object property propagation rules for a desktop publishing software program.

FIG. 6 is a logic flow diagram illustrating a method for creating a predefined layout for a desktop publishing document.

DETAILED DESCRIPTION OF EXEMPLARY EMBODIMENTS

Figure 1:
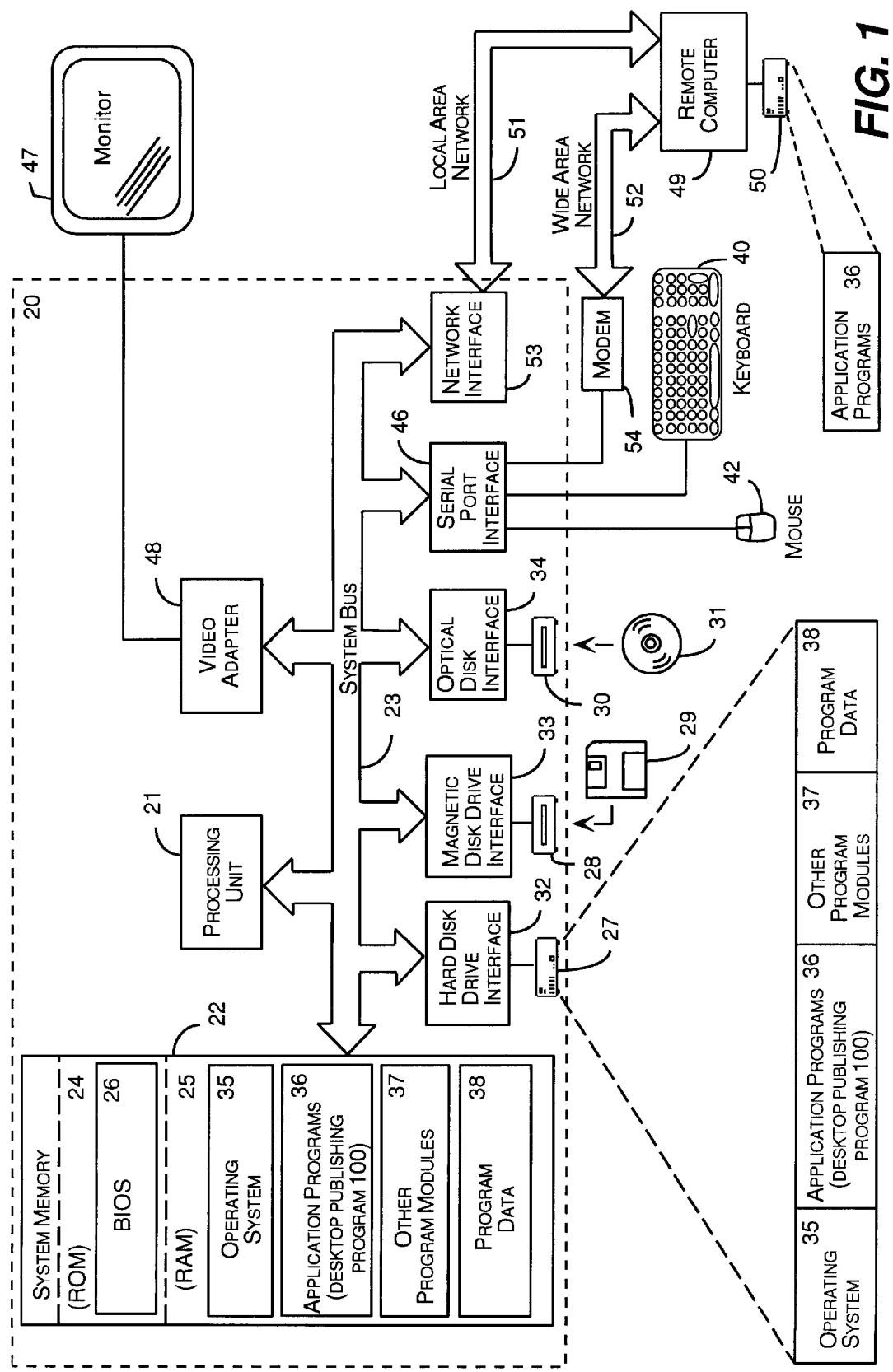
FIG. 1 is a functional block diagram of a personal computer system that provides the operating environment for the exemplary embodiments of the invention.

The invention may be implemented as an object property propagation enhancement to a desktop publishing software program. An exemplary desktop publishing software program is described in U.S. patent application Ser. No. 08/848,976, entitled "Desktop Publishing Software For Automatically Changing The Layout Of Content-Filled Documents," filed May 2, 1997, inventors Benjamin E. Ross, Michael E. Schackwitz, and Kenneth E. Young, which is incorporated herein by reference.

According to the invention, a desktop publishing software program may be configured to propagate object properties within a variety of predefined layouts that may be created by software developers on a layout-by-layout basis. The invention allows format-defining object properties to propagate so that a user-defined format property automatically propagates to other objects in the document. For example, a user-defined font for one of the headlines in a newsletter may automatically propagate to the other headlines. This saves the author of the newsletter from the tedious and time consuming task of making the font change to each headline individually.

Content-defining object properties may also be configured to propagate within the document. For example, the user-defined content for one of the tear-away tabs extending along the bottom of a sales flier may be configured to automatically propagate to the other tabs. This saves the author of the sales flier from the task of copying the user-defined content from a tab edited by the author to the other tabs extending along the bottom of the sales flier. Thus, the author may enter content into all of the tear-away tabs by entering content into just one of the tabs.

To enable object property propagation, the desktop publishing program includes a propagation rule table that includes a format propagation rule and a content propagation rule for one or more objects in the predefined layouts that the desktop publishing program is configured to render. The propagation rule table is preferably a global rule table that applies to all of the predefined layouts that the desktop publishing program is configured to render. This configuration minimizes the memory storage requirement of the desktop publishing program and reduces the likelihood that the user may become confused by different propagation rules occurring in different layouts. If additional flexibility is desired, however, each predefined layout may be associated with a separate propagation rule table.

The objects of each document are organized into a parent-child container structure of components so that each document is constructed from a number of components. A component is parent-level container object that may include a number of other child objects. Each component is a group of objects that the user would normally consider as a single unit. For example, a frame may be a component that contains child objects including a picture, a legend, a title, and a border. Multiple instances of the same component may occur in a document, and multiple instances of the same object may occur in the same component. Each object has a name including an identifier and an instance code that uniquely identifies the object within its component. The same object may be in more than one component, and each object name must be unique within an instance of a component.

The desktop publishing program may also be configured to include one or more content groups that include a number of object identifiers that may be in different components. For example, a number of picture frames, each including an identical logo, that appear on a number pages of a brochure may form a content group. The definition of content groups provides flexibility in defining content propagation rules because certain object property propagation rules apply to objects whose identifiers are in the same content group. The layout may also include one or more format groups that implement the same functionality for format object properties that content groups implement for content object properties.

The definition of content groups and format groups is preferably a global definition that applies to all of the predefined layouts that the desktop publishing program is configured to render. Again, this global definition minimizes the memory storage requirement of the desktop publishing program and reduces the likelihood that the user may become confused by different content and format groups occurring in different layouts. If additional flexibility is desired, however, each predefined layout may be associated with a separate set of content and format groups.

Within this structure, the desktop publishing software program supports the following propagation rules, which may be applied to content properties and format properties separately: (1) do not propagate to any other objects; (2) propagate to objects in the same component whose identifiers belong to the same content or format group; (3) propagate to objects in the same document whose identifiers belong to the same content or format group; (4) propagate to objects in other components of the same document with the same identifiers and instance codes; and (5) propagate to objects in the same document whose identifiers belong to the same content or format group and save the object property in a registry so that the object property propagates to other documents as well.

To avoid annoying certain users by irrevocably linking object properties, each propagation rule for a particular layout may be disabled on a rule-by-rule basis. Specifically, the desktop publishing software program may be configured to automatically disable a propagation rule when the author of a document countermands a previous object property propagation. For example, the author of a newsletter may select a font for the masthead of the newsletter, and the desktop publishing software program may automatically propagate the user-defined masthead font to the headlines and footer of the newsletter. If the author subsequently changes the font for the footer, this font change countermands the propagation of the masthead font to the footer. In this case, the desktop publishing software disables the format propagation rule for the footer so that the user-defined font for the footer does not propagate to the masthead and headlines of the newsletter.

Disabling the propagation rule for a current object property as described above avoids annoying the user by irrevocably propagating the current object property to other object properties. Thus, after the propagation rule for the current object property is disabled, the user may change the current object property without affecting any other object properties. In addition, object properties propagating to the current object from other object properties are also disabled in the propagation rules for the other objects. Thus, after the propagation rule for the other object properties are disabled, the user may change these other object properties without affecting the current object property.

The methodology described above for automatically disabling an object property propagation rule is one technique that may be implemented by the desktop publishing software program. However, automatically disabling object property propagation rules as described above may not be preferred because more flexibility may be provided through a mechanism that allows a user to alter object property propagation rules on a rule-by-rule basis. Many user interface techniques may be used to allow a user to enable and disable object property propagation rules on a rule-by-rule basis. For example, an object property propagation rule may be automatically disabled whenever the user selects an "UNDO" command following the propagation of an object property. Alternatively, a predefined user command, such as a "CTRL+" or an "ALT+" keystroke combination may be used to enable and disable object property propagation rules on a rule-by-rule basis. As another example, the user may select a predefined command, such as a tool bar control item, to enable and disable object property propagation rules on a rule-by-rule basis. The desktop publishing software program may also implement other user interface techniques, such as a pop-up window, grid control, scroll box, or the like to allow the user to enable and disable object property propagation rules on a rule-by-rule basis.

Exemplary Operating Environment

FIG. 1 and the following discussion are intended to provide a brief, general description of a suitable computing environment in which the invention may be implemented. While the invention will be described in the general context of a desktop publishing software program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24.

The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media that are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, other program modules 37, and program data 38. In particular, one of the program modules is a desktop publishing software program 100 that includes certain embodiments of the invention, which are described below with reference to FIGS. 2–9. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Exemplary embodiments of the present invention are incorporated into the PUBLISHER 98 application program sold by Microsoft Corporation on CD-ROM for use with personal computer systems such as the illustrative personal computer 20. The invention may be deployed within, or in connection with, the OFFICE 97 suite of application programs including, among others, a WORD 97 word processing application program. It will be appreciated that the principles of the invention are not limited desktop publishing software programs, but could equivalently be applied to any computer-implemented system that involves the use of predefined document layouts.

For example, the invention may be implemented within a system that allows the user to extract objects from a document, such as a system that allows the user to drag headlines, footers, or the like from a desktop publishing document and to drop these objects into a file in another program module. In this case, the object property propagation rules defined by the desktop publishing program may be automatically applied to the extracted objects after they are dropped into the file in the other program module. In addition, it is anticipated that the invention may be deployed in connection with future versions of Microsoft's word processing application programs, slide-show presentation application programs, and so forth. It will be further appreciated that the invention could equivalently be implemented on host computers other than personal computers, and could equivalently be transmitted to the host computer by means other than a CD-ROM, for example, by way of the network connection interface 53.

Notwithstanding the broad applicability of the principles of the invention described above, it should be understood that the configuration of the exemplary embodiment as an application program for widely-used personal computers provides significant advantages. In particular, the desktop publishing software program 100 described in this specification is specifically designed to exhibit acceptable memory-use and performance characteristics when implemented on the conventional personal computer system 20. In so configuring the desktop publishing software program 100, certain trade-off balances, particularly between the often conflicting goals of minimizing memory storage and increasing performance speed, have necessarily been truck. It should be understood that variations of the trade-off balances struck in the exemplary embodiments described in this specification are within the spirit and scope of the present invention, particularly in view of the fact that inevitable improvements in computer hardware and memory storage devices will make other trade-off balances feasible.

The Desktop Publishing Software Program

Figure 2:
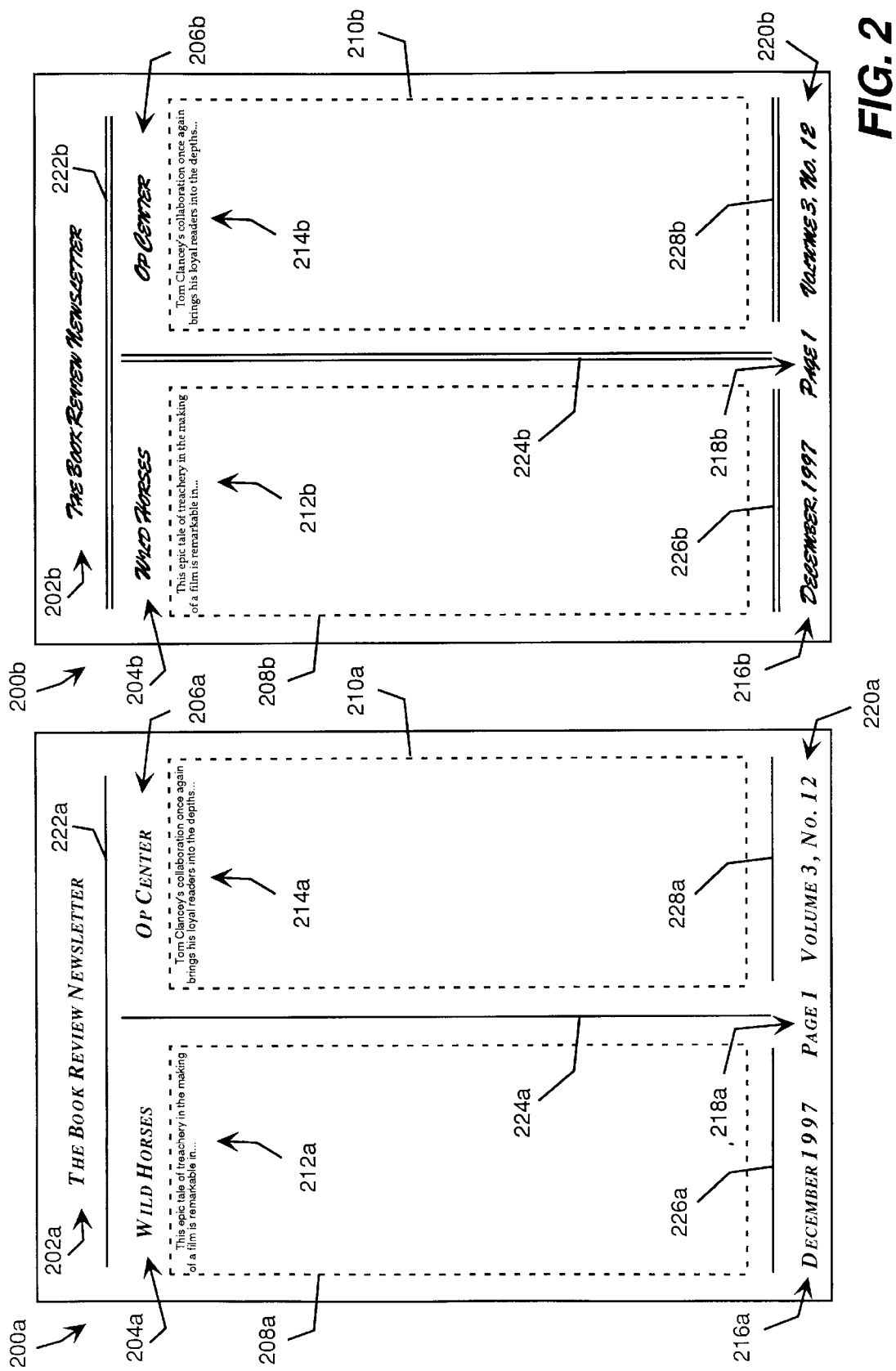
FIG. 2 includes two diagrams that illustrate a desktop publishing document with propagating object properties.

FIG. 2 includes two diagrams 200a and 200b that illustrate a desktop publishing document with propagating object properties. The author creates the desktop publishing document 200a in the usual way. For example, the desktop publishing software program 100 typically begins in a "menu mode" implemented by a high-level user interface known as a "wizard." The author of the document 200a typically begins by entering a set of selection commands into a menu-driven layout selection utility to define the layout of the document that the author wants to create. Once the user is satisfied with the selections in the menu-driven utility, the user enters an acceptance command. The desktop publishing software program 100 then enters a "render mode" and the wizard then translates the author's selections into a generic document conforming to the layout defined by the author's selection commands.

After the desktop publishing software program 100 enters the render mode, the author may make additional changes to the document, for example by entering content into certain objects of the document. The user may also add, delete, and modify any of the objects rendered by the wizard. The author may also return to the menu-driven layout selection utility to change the layout of the document. In other words, the user may toggle the desktop publishing software program 100 between the menu mode and the render mode while composing the document 200a.

The menu-driven utility implemented by the wizard makes it easy for the author to define the layout of the document 200a. Because most documents may be initially defined by standard layout parameters, requiring the author to begin each new document with a blank page would force the author to enter a lot of basic formatting information into each new document. This is a tedious and time-consuming process that most authors do not want to repeat unnecessarily. The wizard helps the author get started by accepting the menu-driven set of instructions as input and rendering an automatically-formatted generic document as output. The user may then make changes to the generic document when the program 100 enters the edit mode.

Typically, the objects in the generic document rendered by the wizard may be empty or they may include default content, such as an instruction like "insert title here," or Latin text or some other type of gibberish. The author of the document 200a replaces this default content with author-defined content to complete the desired document. In completing the document, the author may also make a wide variety of other changed to the document rendered by the wizard, such as adding or deleting objects, or changing the size, position, or formatting of objects.

More specifically, the preferred menu-driven utility typically includes a first selection menu from which the author selects the type of document that the author wants to create. The first selection menu typically includes a comprehensive list of the types of predefined layouts that the wizard can create, such as the following: newsletter, flyer, brochure, website, postcard, label, business form, letterhead, sign, business card, card invitation, calendar, envelope, and banner. After the author selects a particular predefined layout, the menu-driven utility presents the author with a list of selection items, which the author completes to further define the layout of the desired document. For example, if the author selects the newsletter document type, the menu-driven utility may present the following list of selection items: number of columns=?; style=?; table of contents=?; and masthead=?. The author may then complete the list of selection items to further define the layout as follows: columns=2; style=jazzy; table of contents=yes; and masthead=horizontal.

Once the author has completed the list of selection items, the author enters an acceptance command, which causes the wizard to render the initial document. Continuing with the preceding example, the wizard accepts the menu-driven list of selection items (i.e., type=newsletter; columns=2; style=jazzy; table of contents=yes; and masthead=horizontal) as input, and produces a newsletter-type document with two columns, a jazzy-style font, a table of contents, and a horizontal masthead. Each object of the document produced by the wizard, such as the columns of text, the table of contents, and the masthead may be empty or may include default content, such as an instruction like "insert title here," or Latin text or some other type of gibberish.

After the wizard renders the generic document, the desktop publishing software program 100 enters the edit mode, during which the author may enter the desired content into the document. For example, the author replaces the "insert title here" instruction that appears in the masthead object of the document with the actual title of the newsletter that the author wants to create; the author replaces the empty area or the gibberish text the appears in the columns of text objects of the document with the actual text of the newsletter articles that the author wants to create, etc. When completing the document, the author may also make other changes to the layout initially produced by the wizard, such as changing the size and position of objects, inserting new objects such as picture frames, changing the size and font of text, etc.

The document 200a represents an example of a newsletter that an author might create with the desktop publishing software program 100. The newsletter includes a masthead 202a that reads "The Book Review Newsletter." The newsletter is in a two-column format including a first column headline 204a that reads "Wild Horses" and a second column headline 206a that reads "Op Center." Under the headlines 204a and 206a, the newsletter includes text blocks 208a and 210a, respectively. The text blocks 208a and 210a include user-defined text 212a and 214a, respectively. The bottom of the newsletter includes a footer including a date 216a reading "December 1997," a page number 218a reading "Page 1," and a volume number 220a reading "Volume 3, No. 12." The newsletter also includes a horizontal section bar 222a under the title 202a, a vertical section bar between the two text blocks 208a and 210a, and the two horizontal footer bars 226a and 228a below the text blocks 208a and 210a, respectively.

To enable object property propagation for the newsletter, a software developer has created an object property propagation paradigm for the layout. The object property propagation paradigm is stored in the form of an object property propagation rule table, which is described below with reference to FIG. 4. When creating the propagation paradigm for a particular layout, the software developer typically links object properties that the author of a document in that layout almost always wants to be the same.

For example, in the newsletter example shown in FIG. 2, the software developer may decide that the author of a newsletter in this layout will almost always want the same font for the masthead 202a, the headlines 204a and 206a, the date 216a, the page number 218a, and the volume number 220a. And so the software developer configures the font of the masthead 202a, the headlines 204a and 206a, the date 216a, the page number 218a, and the volume number 220a to propagate to each other. To configure the font for these objects to propagate to each other, the identifiers for these objects may be placed in a format group. This format group may then be assigned a propagation rule that causes format properties (e.g., font) to propagate to all objects in the format group regardless of instance code. Thus, if the author of the newsletter changes the font for any object in the format group, the desktop publishing software program 100 automatically changes the font for the other objects in the format group.

The transition from the document 200a to the document 200b illustrates object property propagation for the font of the masthead 202a, the headlines 204a and 206a, the date 216a, the page number 218a, and the volume number 220a. For example, the user may change the font of the masthead 200a as shown in document 200a to the font of the masthead 200b as shown in document 200b. In response to this change, the desktop publishing software program 100 automatically changes the font of the headlines 204a and 206a, the date 216a, the page number 218a, and the volume number 220a as shown in the document 200a to the font of the headlines 204b and 206b, the date 216b, the page number 218b, and the volume number 220b as shown in the document 200b. This object property propagation saves the author of the document from the tedious and time consuming task of changing the font for the masthead 202a, the headlines 204a and 206a, the date 216a, the page number 218a, and the volume number 220a individually.

To avoid annoying the user by irrevocably linking the fonts for the masthead 202b, the headlines 204b and 206b, the date 216b, the page number 218b, and the volume number 220b, the desktop publishing software program 100 allows the publication rules to be disabled on a rule-by-rule basis. For example, if the user makes an editorial change that countermands a previous object propagation for a particular object property, then the desktop publishing software program 100 may automatically disable the object propagation rule for that particular object property. Continuing with the preceding newsletter example, if the user changes the font of the page number 218b, the desktop publishing software program 100 disables the object property propagation rule for the page number 218b so that the fonts for the masthead 202b, the headlines 204b and 206b, the date 216b, and the volume number 220b are not automatically changed to be the same as the font for the page number 218b. In addition, the object property propagation rules for the masthead 202b, the headlines 204b and 206b, the date 216b, and the volume number 220b are also changes so that these properties do not automatically propagate to the font for the page number 218b.

As noted previously, many other types of user interface techniques may be implemented to allow the user to enable and disable object property propagation rules on a rule-byrule basis. For example, the desktop publishing software program 100 may include a pop-up user interface that allows the user of the program (i.e., the author of the document 200) to enable and disable object property propagation rules on a rule-by-rule basis. In this case, the object property propagation paradigm created by the software developer forms the default entries for the object property propagation rules. The pop-up user interface allows the user to view the default object property propagation rules created by the software developer and to change the rules, and define new rules, on a rule-by-rule basis.

Object property propagation may be defined for any set of objects in the newsletter. For example, the format horizontal section bar 222*a*, the vertical section bar 224*a*, and the horizontal footer bars 226*a* and 228*a* may be configured to propagate to each other. Thus, if the user changes the horizontal section bar 222*a*, for instance, from the single-line format shown in document 200*a* to the double-line format shown in document 200*b*, the desktop publishing software program 100 automatically changes the format of the vertical section bar 224*a*, and the horizontal footer bars 226*a* and 228*a* from the single-line format shown in document 200*a* to the double-line format shown in document 200*b*.

The newsletter described above is one example of many types of predefined layouts that may be included in the desktop publishing software program 100. For example, object property propagation rules may also apply to the content of objects, as in the sales flier example discussed earlier. In fact, the desktop publishing software program 100 allows a software developer to define a content object property propagation rule and a format object property propagation rule for every object in a layout. Objects having the same content object property propagation rule may be grouped into a content group, and objects having the same format object property propagation rule may be grouped into a format group. Content and format groups minimize the required size of the table that stores the object property propagation rules for the layout.

Consider the footer of a newsletter as an example. A software developer may determine that the author of a newsletter will most likely want the content and format of the footer to be the same on every page of the newsletter. In addition, the software developer may determine that the author of a newsletter will most likely want the format of the footers to match the format of the masthead and headlines. To accomplish this result, the developer defines a content group that includes the footers on each page of the newsletter. The propagation rule for this content group causes the content entered for one of the footers to automatically propagate to the other footers. In addition, the developer defines a format group that includes the footers, masthead, and headlines of the newsletter. The propagation rule for this format group causes format properties, such as a font, selected for one of these objects to automatically propagate to the other objects.

Thus, many types of layouts with corresponding object property propagation paradigms may be created by software developers on a layout-by-layout basis. The parent-child container structure for a desktop publishing document and the object propagation rules described below facilitate the creation of new layouts, with new object property propagation paradigms, after the release of the basic desktop publishing software program 100.

Figure 3:
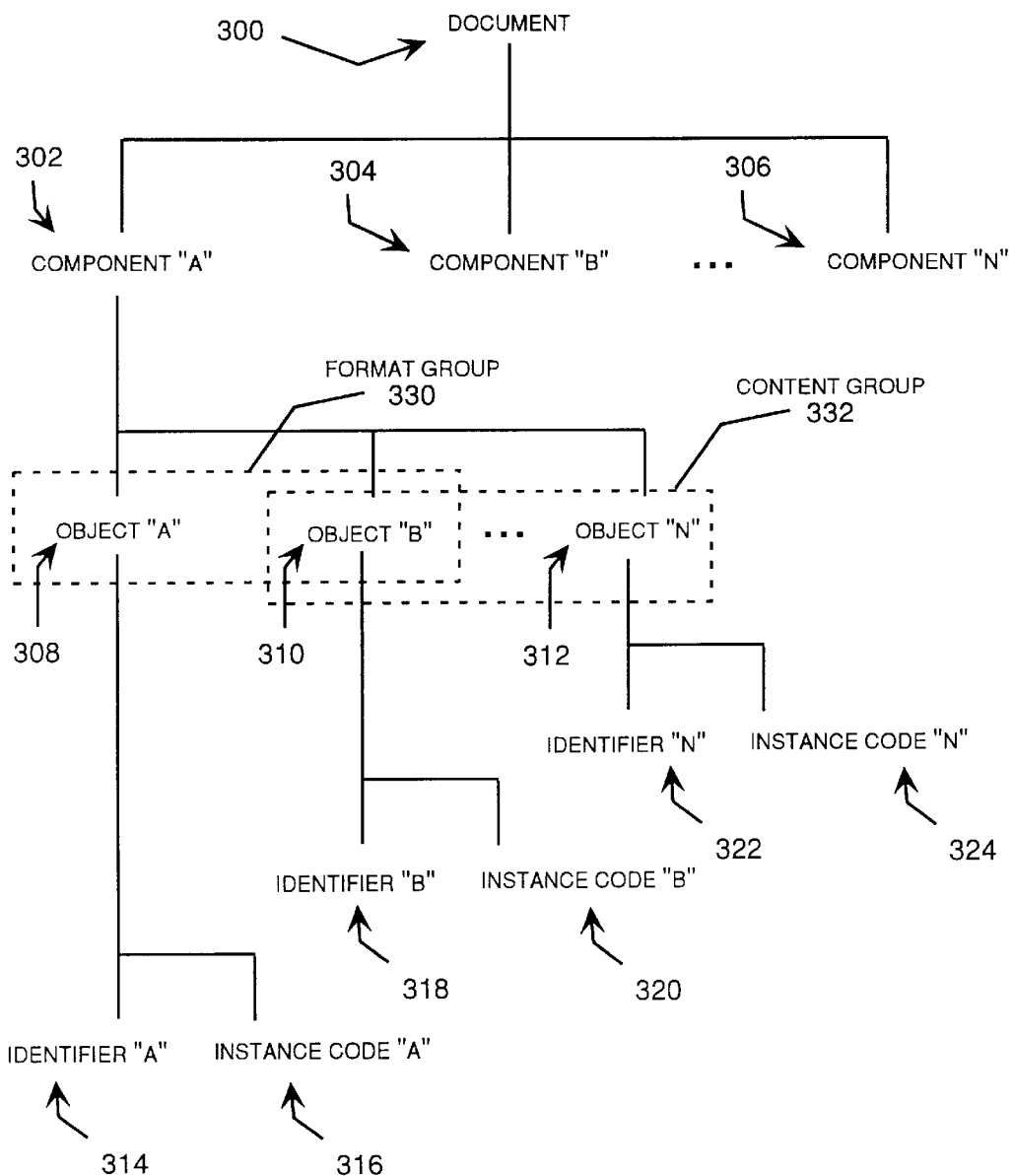
FIG. 3 is a diagram illustrating a parent-child container structure for a desktop publishing document.

FIG. 3 is a diagram illustrating a parent-child container structure for a desktop publishing document 300. The objects of each document created with the desktop publishing software program 100, represented by the document 300, are organized into a parent-child container structure of components so that each document is constructed from a number of components represented by the components 302, 304, and 306. A component is parent-level container object that may include a number of other child objects. For example, the component "A" 302 includes the objects 308, 310, and 312. Each component is a group of objects that the user would normally consider as a single unit. For example, the component "A" 302 may be a frame that contains child objects 308, 310, and 312 including a picture, a legend, and a border.

Multiple instances of the same component may occur in the document 300, and multiple instances of the same object may occur in the same component. Each object has a name including an identifier and an instance code that uniquely identifies the object within its component. For example, the object "A" 308 has an identifier "A" 314 and an instance code "A" 316, the object "B" 310 has an identifier "B" 318 and an instance code "B" 320, and so forth. Objects with the same identifier are similar, but may have different user-defined format and content properties.

Referring to FIG. 2, for example, the headline 204 might be named "headline.1" (i.e. identifier=headline, instance code=1) and the headline 206 might be named "headline.2" (i.e. identifier=headline, instance code=2). Referring to the sales flier example, the tear-away tabs along the bottom of the flier might be named "tab.1" (i.e. identifier=tab, instance code=1) through "tab.n" The same object may be in more than one component, and each object name must be unique within an instance of a component.

The layout may also be configured to include one or more format groups, represented by the format group 330, that include a number of tags, such as object identifiers, that may be used on objects in different components. Referring to FIG. 2, the format horizontal section bar 222, the vertical section bar 224, and the horizontal footer bars 226 and 228 might form a format group. An object property propagation rule may be selected for the format group 330 to cause format object properties applied to any object in the format group to automatically apply to the other objects of the format group. Thus, the font selected for the horizontal section bar 222 automatically applies to the vertical section bar 224, and the horizontal footer bars 226 and 228.

The document 300 may also include one or more content groups, represented by the content group 332, that implement the same functionality for content object properties that format groups implement for format object properties. For example, a number of picture frames, each including an identical logo, that appear on a number pages of the newsletter may form the content group 332. An object property propagation rule may be selected for the content group 332 to cause the content entered for any object in the content group to automatically apply to the other objects of the content group. Thus, the content entered for the logo picture frame on one page of the newsletter automatically applies to the logo picture frames on the other pages of the newsletter. The definition of format and content groups provides flexibility in defining format and content object property propagation paradigms because certain object property propagation rules apply to objects whose identifiers are in the same content or format group.

FIG. 4A illustrates a table 400 of objects having associated format and content groups in the desktop publishing software program 100. The table 400 includes a first column 402 that contains a list of object identifiers, a second column 404 that contains a list of format group names, and a third column 406 that contains a list of content group names. Each row 408a through 408n of the table 400 contains one object identifier, one format group name, and one content group name. Thus, the table 400 may associate each object identifier with one format group and one content group.

For example, the object identifier "HEADLINE" is associated with the format group named "HEADS_AND_FOOTS_FMT" and the content group named "HEADLINE_CONTENT." In addition, the object identifier "FOOTER" is associated with the format group named "HEADS_AND_FOOTS_FMT" and the content group named "FOOTER_CONTENT." The table 400 need not include every object identifier used in the layout because objects that do not propagate in format or content may be excluded from the table. In addition, the table 400 only includes the name of a format group and the name of a content group.

FIG. 4B illustrates a table 410 of object property propagation codes for format groups in the desktop publishing software program 100. The table 410 includes a first column 412 that contains a list of format group names, and a second column 414 that contains an object property propagation code. Each row of the table 410, represented by the row 416, contains one format group name and one object property propagation code. Thus, the table 410 may associate each format group name with one object property propagation code. For example, the format group named "HEADS_AND_FOOTS_FMT" is associated with the object property propagation code number "3."

FIG. 4C illustrates a table 420 of object property propagation codes for content groups in the desktop publishing software program 100. The table 420 includes a first column 422 that contains a list of content group names, and a second column 414 that contains an object property propagation code. Each row of the table 410, represented by the rows 426a and 426b, contains one content group name and one object property propagation code. Thus, the table 420 may associate each content group with one object property propagation code. For example, the content group named "HEADLINE_CONTENT" is associated with the object property propagation code number "1" and the content group named "FOOTER_CONTENT" is associated with the object property propagation code number "3."

FIG. 5 illustrates a table 500 of object property propagation rules for the desktop publishing software program 100. The table 500 illustrates the meaning of the object property propagation codes included in tables 410 and 420. The table 500 includes a first column 502 that contains a list of object property propagation codes and a second column 504 that contains a list of object property propagation rules. Each row 506a through 506e of the table 500 contains one object property propagation code and one object property propagation rule. Thus, the tables 400, 410, and 420 may associate each object identifier of a document with a format propagation rule and a content propagation rule selected from the table 500.

Specifically, the table 500 includes following propagation rules, which may be applied to content properties and format properties separately: (1) do not propagate to any other object, as shown in row 506a; (2) propagate to objects in the same component whose identifiers belong to the same content or format group, as shown in row 506b; (3) propagate to objects in the same document whose identifiers belong to the same content or format group, as shown in row 506c; (4) propagate to objects in other components of the same document with the same identifier and instance code; and (5) propagate to objects in the same document whose identifiers belong to the same content or format group and save the object property in a registry so that the object property propagates to other documents, as shown in row 506e.

It will be appreciated that the table 500 does not have to actually be stored in memory, but instead represents instructions implemented by the program 100. It will also be appreciated that the registry referred to above could be any type of accessible memory location that is assigned or indexed to a particular user. For example, the registry could be a conventional system registry, a dedicated memory address, a dedicated data file, or any other type of accessible memory location that may be created in the future.

FIG. 6 is a logic flow diagram illustrating a method 600 for creating a redefined layout for a desktop publishing document. A software developer typically follows the method 600 when creating a predefined layout for a desktop publishing document after the basic desktop publishing software program 100 has been released. The software developer typically uses a Software Developer's Kit (SDK) to implement the method 600 on a layout-by-layout basis.

In step 602, the software developer creates a predefined layout for a desktop publishing document. Step 602 includes creating the predefined layout itself and creating a menu-driven utility for the predefined layout. The menu-driven utility allows a user to enter selection commands that define the appearance of a document created in the predefined layout. Step 602 is followed by routine 604, in which the software developer creates an object propagation paradigm for the predefined layout. Routine 604 is described in greater detail below with reference to FIG. 7. Routine 604 is followed by step 606, in which the software developer saves the predefined layout along with the object propagation paradigm. A user may then use the predefined layout, along with the object propagation paradigm, to author desktop publishing documents in the predefined layout.

For example, if the desktop publishing software program 100 includes a global propagation rule table, the software developer saves the predefined layout along with the object propagation paradigm by appending the global propagation rule table. Alternatively, if the desktop publishing software program 100 includes a separate propagation rule table for each layout, the software developer saves the predefined layout along with the object propagation paradigm by saving a newly-created propagation rule table for the newly-created layout. Routine 606 is followed by the "END" step 608, which completes method 600.

Figure 7:
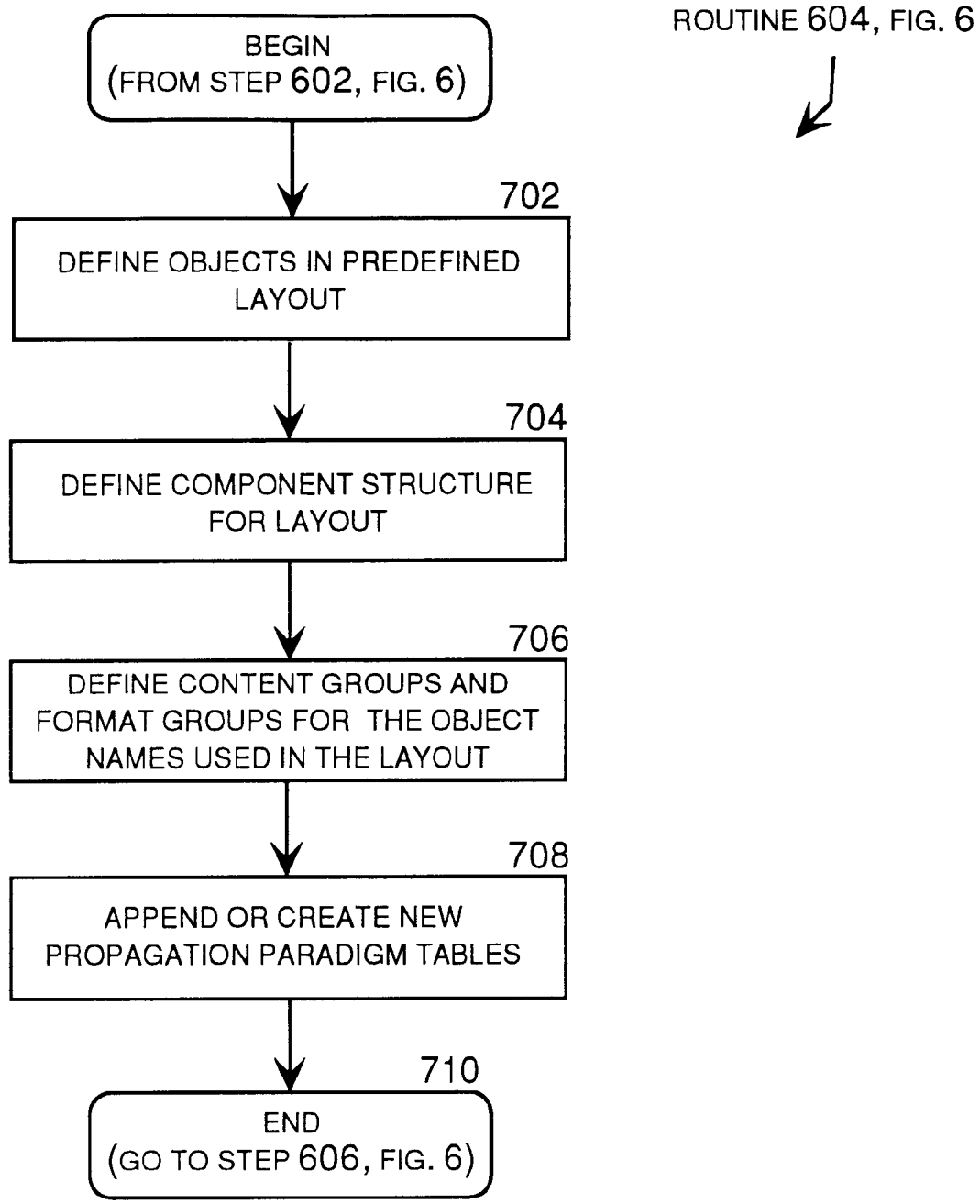
FIG. 7 is a logic flow diagram illustrating a method for creating an object property paradigm for a desktop publishing document.

FIG. 7 is a logic flow diagram illustrating routine 604 for creating an object property paradigm for a desktop publishing document. Routine 604 follows step 602 shown on FIG. 6. In step 702, the software developer defines objects in the predefined layout. Step 702 is followed by step 704, in which the software developer defines a component structure for the predefined layout. Step 704 is followed by step 706, in which the software developer defines content groups and format groups for the object identifiers used in the predefined layout. Step 706 is followed by step 708, in which the software developer creates propagation paradigm tables for the content and format groups, such as the tables 400 and 500 described above with reference to FIGS. 4 and 5. Step 708 is followed by the "END" step 710, which returns to step 606 shown on FIG. 6.

Figure 8:
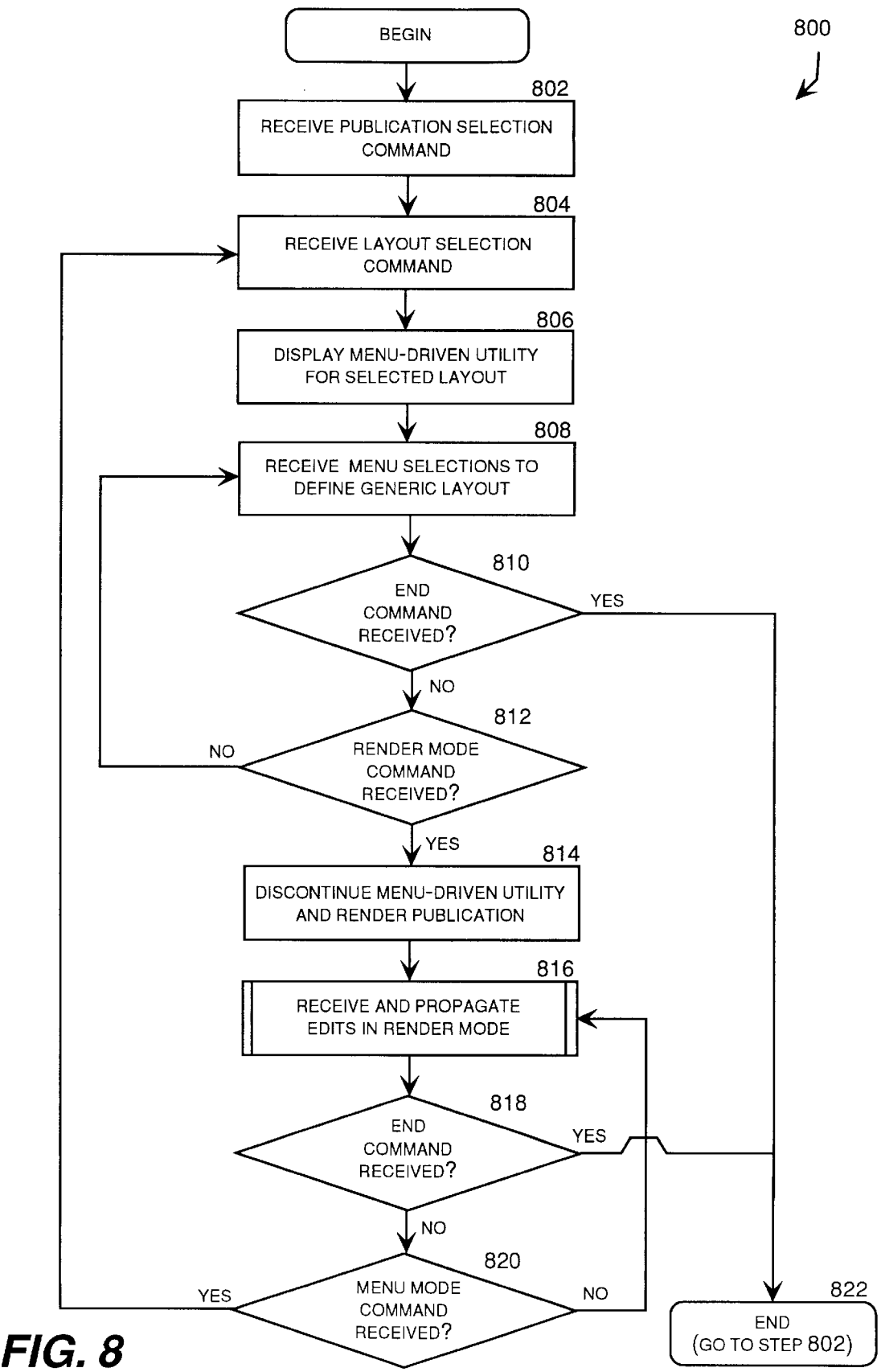
FIG. 8 is a logic flow diagram illustrating a method for creating a desktop publishing document with a desktop publishing software program.

FIG. 8 is a logic flow diagram illustrating a routine 800 for creating a document with the desktop publishing software program 100. Routine 800 is implemented by the desktop publishing software program 100 as a user authors the document. In step 802, the program 100 receives a publication selection command. The publication selection command identifies a previously-created document that the user wants to work on. As discussed previously, the program 100 allows the user to apply new layouts to previously-created, content-filled documents. The user enters the publication selection command to select such a content-filled document. If the user is authoring a new document, on the other hand, step 802 may be skipped.

Step 802 is followed by step 804, in which the program 100 receives a layout selection command. The user enters the layout selection command to select a particular predefined layout for the document. For example, the user may select a predefined layout that was created by a software developer in accordance with the method 600 illustrated on FIG. 6. Step 804 is followed by step 806, in which the program 100 displays a menu-driven utility for the predefined layout. Step 806 places the program 100 in the menu mode. Step 806 is followed by step 808, in which the program 100 receives selection commands through the menu-driven utility to define the appearance of a generic document in the predefined layout.

Step 806 is followed by step 808, in which the program 100 may receive an "END" command. It will be appreciated that the "END" command could, in fact, be received at any point in routine 800. The "END" command decision step 810 therefore represents an "END" command that could be received at any point in routine 800. If the program 100 receives an "END" command, the "YES" branch is followed from step 810 to the "END" step 822, which concludes routine 800. From the "END" step 822, routine 800 preferably returns to step 802 when the user again activates the program 100.

If the program 100 does not receive an "END" command, the "NO" branch is followed from step 810 to step 822, in which the program 100 determines whether a render mode command has been received. If a render mode command has not been received, the "NO" branch loops to from step 812 step 808, in which the program 100 may receive additional selection commands in the menu mode. If a render mode command has been received, the "YES" is followed from step 812 step 814, in which the program 100 enters the render mode. Step 814 includes discontinuing the display of the menu-driven utility, rendering the document in accordance with the selection commands received through the menu-driven utility, and displaying the document on the display device.

Step 814 is followed by routine 816, in which the program 100 receives and propagates editorial changes, such as content entries and format changes, in the edit mode. Routine 816 for receiving and propagating editorial changes is described in greater detail below with reference to FIG. 9. Routine 816 is followed by step 818, in which the program 100 may receive an "END" command. It will again be appreciated that the "END" command could, in fact, be received at any point in routine 800. If the program 100 receives an "END" command, the "YES" branch is followed from step 818 to the "END" step 822, which concludes routine 800.

If the program 100 does not receive an "END" command, the "NO" branch is followed from step 818 to step 820, in which the program 100 may receive a menu mode command. If the program 100 receives a menu mode command, the "YES" branch loops from step 820 to step 804, and the program returns to the menu mode. If the program 100 does not receive a menu mode command, the "NO" branch loops from step 820 to step 816, in which the program may receive additional editorial changes in the render mode. Thus, the user may toggle between the menu mode and the render mode while working on the document.

Figure 9:
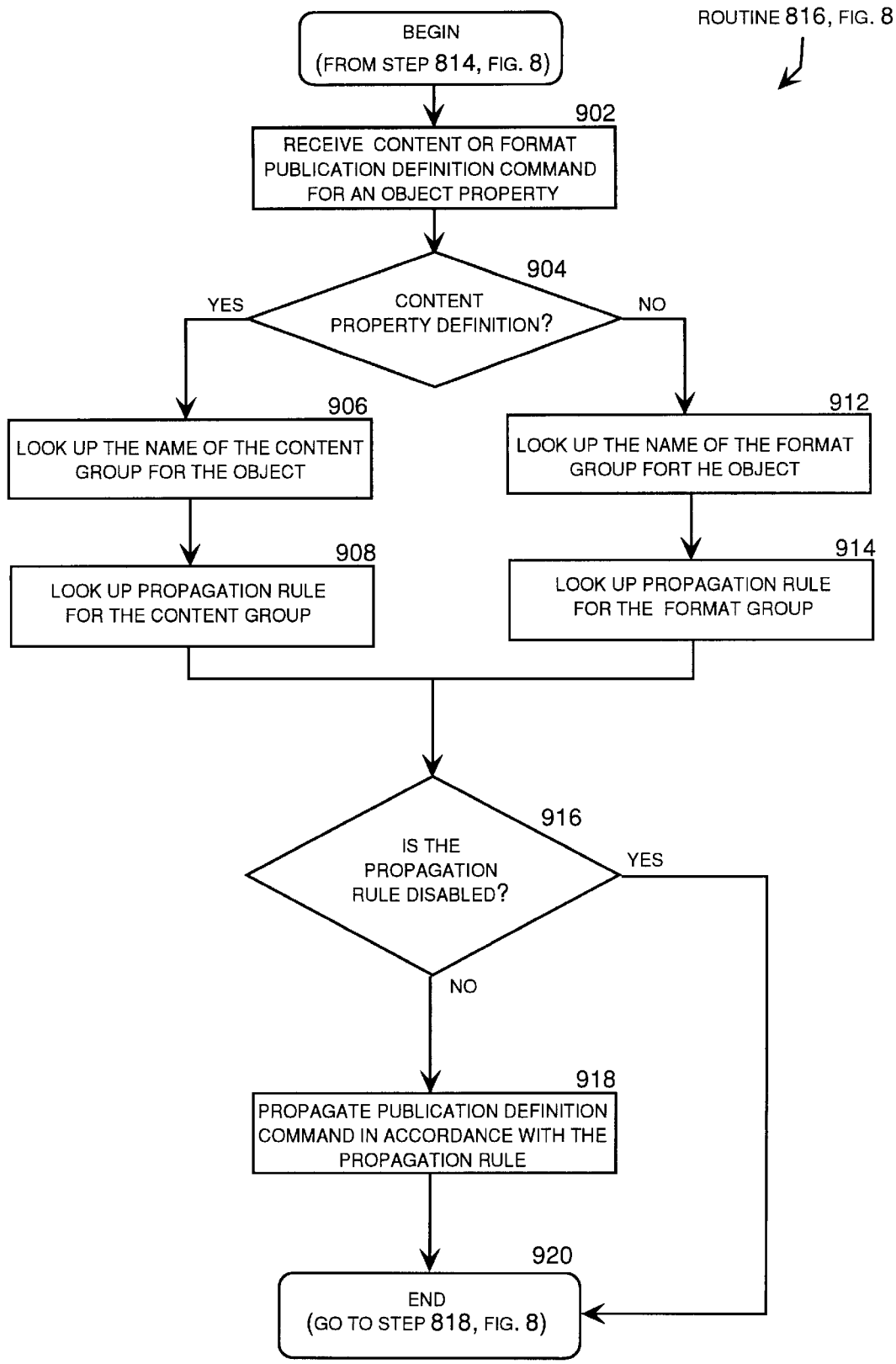
FIG. 9 is a logic flow diagram illustrating a method for propagating object properties in a desktop publishing software program.

FIG. 9 is a logic flow diagram illustrating routine 816 for propagating object properties in the desktop publishing software program 100. Routine 816 follows step 814 shown on FIG. 8. In step 902, the program 100 receives a content or format publication definition command for an object property. As noted previously, the appearance of the document is defined by the content and format properties defining the appearance of the various objects in the document. Therefore, any type of editorial change that the author of a document might make while the program 100 is in the edit mode may be characterized as a content or format publication definition command.

Step 902 is followed by step 904, in which the program 100 determines whether the received publication definition command is a content publication definition command. If the received publication definition command is a content publication definition command, the "YES" branch is followed from step 904 to step 906, in which the program 100 looks up the name of the content group for the object. Step 906 is followed by step 908, in which the program 100 looks up the object property propagation rule for the content group.

Referring again to step 904, if the received publication definition command is a not content publication definition command, then the publication definition command is a format publication definition command. In this case, the "NO" branch is followed from step 904 to step 912, in which the program 100 looks up the name of the format group for the object. Step 912 is followed by step 914, in which the program 100 looks up the object property propagation rule for the format group.

Steps 908 and 914 are followed by step 916, in which the program 100 determines whether the object property propagation indicated by the retrieved propagation rule is disabled. If the object property propagation indicated by the retrieved propagation rule is disabled, the "YES" branch is followed from step 916 to step 920, which returns to step 818 shown on FIG. 8. If the object property propagation indicated by the retrieved propagation rule is not disabled, the "NO" branch is followed from step 916 to step 918, in which the program 100 propagates the object property in accordance with the retrieved propagation rule. Step 918 is followed by the "END" step 920, which returns to step 818 shown on FIG. 8.

Allowing the user to disable the propagation rule for the current object property, as represented by the decision of step 918, avoids annoying the user by irrevocably propagating the current object property to other object properties. Thus, after the user disables the propagation rule for the current object property, the user may change the current object property without affecting any other object properties. In addition, the user may also disable object properties propagating to the current object from other object properties in the propagation rules for the other object properties. Thus, after the user disables the propagation rules for the other object properties, the user may change these other object properties without affecting the current object property.

In view of the foregoing, it will be appreciated that the invention provides a desktop publishing software program configured to propagate object properties so that user-defined object properties automatically propagate to other objects in a document. The desktop publishing software program allows software developers to define propagation rules for a variety of predefined layouts on a layout-bylayout basis. It should be understood that the foregoing relates only to the exemplary embodiments of the present invention, and that numerous changes may be made therein without departing from the spirit and scope of the invention as defined by the following claims.

The invention claimed is:

1. A computer-readable medium having computer-executable instructions for performing the steps of:

receiving a layout selection command corresponding to a predefined layout for a document;

the layout comprising a predefined set of objects, each object having a set of object properties for defining a visible element of the document;

each object property having a propagation code associated with an object propagation rule for coordinating that object property with a predefined set of other object properties, wherein the propagation codes and their associated rules are stored within an object propagation rule table;

receiving a publication definition command setting an object property definition for a first one of the object properties;

using the object propagation code associated with the first object property to retrieve the propagation rule for the first object property from the object propagation rule table; and propagating the object property definition for the first object property to a predefined group of the objects in accordance with the propagation rule for the first object property.

2. The computer-readable medium of claim 1, further comprising the steps of:

receiving a disable command associated with the propagation rule for the first object property; and in response to the disable command, disabling the propagation rule for the first object property.

3. The computer-readable medium of claim 1, wherein:

the layout further comprises a plurality of components, each component comprising a plurality of the objects;

each object having an associated identifier; and the propagation rule comprises propagating the object property definition for the first object property to the objects in the same component with the same identifier.

4. The computer-readable medium of claim 1, wherein:

the layout further comprises a plurality of components, each component comprising a plurality of the objects;

each object having an associated identifier; and the propagation rule comprises propagating the object property definition for the first object property to the objects with the same identifier in the document.

5. The computer-readable medium of claim 1, wherein:

the layout further comprises a plurality of components, each component comprising a plurality of the objects;

each object having an associated identifier and an associated instance code; and the propagation rule comprises propagating the object property definition for the first object property to the objects with the same identifier and the same instance code in the document.

6. The computer-readable medium of claim 1, wherein:

the layout further comprises a plurality of components, each component comprising a plurality of the objects;

each object having an associated identifier and an associated instance code; and the propagation rule for the first object property is selected from a group of propagation rules including, a first rule for no propagation of the object property definition for the first object property, a second rule for propagating the object property definition for the first object property to the objects in the same component with the same identifier, a third rule for propagating the object property definition for the first object property to the objects with the same identifier in the document, and a fourth rule for propagating the object property definition for the first object property to the objects with the same identifier and the same instance code in the document.

7. The computer-readable medium of claim 6, wherein the group of propagation rules further includes a fifth rule for propagating the object property definition for the first object property to a registry file that sets corresponding object property definitions in other documents.

8. The computer-readable medium of claim 1, wherein:

the layout further comprises a plurality of components, each component comprising a plurality of the objects;

each object having an associated identifier and an associated instance code;

the layout further comprises a plurality content groups, each content group comprising a plurality of the object identifiers that are used in a plurality of the components; and the step of retrieving the propagation rule for the first object property comprises the steps of, determining whether the first object property is a content property;

if the first object property is a content property, identifying a particular one of the content groups that is associated with the first object, and retrieving a propagation rule associated with the content group that is associated with the first object.

9. The computer-readable medium of claim 8, wherein:

the layout further comprises a plurality of components, each component comprising a plurality of the objects;

each object having an associated identifier and an associated instance code;

the layout further comprises a plurality format groups, each format group comprising a plurality of the object identifiers that are used in a plurality of the components; and the step of retrieving the propagation rule for the first object property comprises the steps of, determining whether the first object property is a format property;

if the first object property is a format property, identifying a particular one of the format groups that is associated with the first object, and retrieving a propagation rule associated with the format group that is associated with the first object.

10. In or for a computer system comprising a processing unit, a user input device coupled to the processing unit, a memory coupled to the processing unit, a display device coupled to the processing unit, and a desktop publishing program running on the processing unit, a method for rendering a desktop publishing document comprising:

receiving a layout selection command from the user input device corresponding to a predefined layout for the document;

the layout comprising a predefined set of objects, each object having a user-definable set of object properties for defining a visible element of the desktop publishing document;

each object property having a propagation code associated with an object propagation rule for coordinating that object property with a predefined set of other object properties, wherein the propagation codes and their associated rules are stored within an object propagation rule table;

receiving a publication definition command setting an object property definition for a first one of the object properties, using the object propagation code associated with the first object property to retrieve the propagation rule for the first object property from the object propagation rule table; and propagating the object property definition for the first object property to a predefined group of the objects in accordance with the propagation rule for the first object property; and displaying the document on the display device.

11. The method of claim 10, wherein the step of propagating the object property definition for the first object property comprises the step of setting an object property definition for a second object property to be the same as the object property definition for the first object property, further comprising the steps of:

receiving a second publication definition command from the user input device countermanding the propagation of the definition of the first object property to the second object property; and in response to the second publication definition command, disabling the propagation rule for the second object property.

12. The method of claim 10, wherein:

the layout further comprises a plurality of components, each component comprising a plurality of the objects;

each object having an associated identifier;

the layout further comprises a plurality of groups including objects identifiers that occur in a plurality of the components; and the propagation rule comprises propagating the object property definition for the first object property to objects in the same component whose object identifiers belong to the same group.

13. The method of claim 10, wherein:

the layout further comprises a plurality of components, each component comprising a plurality of the objects;

each object having an associated identifier;

the layout further comprises a plurality of groups including objects identifiers that occur in a plurality of the components; and the propagation rule comprises propagating the object property definition for the first object property to objects in the same document whose object identifiers belong to the same group.

14. The method of claim 10, wherein:

the layout further comprises a plurality of components, each component comprising a plurality of the objects;

each object having an associated an identifier and an associated instance code; and the propagation rule comprises propagating the object property definition for the first object property to objects with the same identifiers and the same instance codes in the document.

15. The method of claim 10, wherein:

the layout further comprises a plurality of components, each component comprising a plurality of the objects;

each object having an associated an identifier and an associated instance code;

the layout further comprises a plurality of groups including objects identifiers that occur in a plurality of the components; and the propagation rule for the first object property is selected from a group of propagation rules including, a first rule for no propagation of the object property definition for the first object property, a second rule for propagating the object property definition for the first object property to objects in the same component whose object identifiers belong to the same group, a third rule for propagating the object property definition for the first object property to objects in the same document whose object identifiers belong to the same group, and a fourth rule for propagating the object property definition for the first object property to objects with the same identifiers and the same instance codes in the document.

16. The method of claim 15, wherein the group of propagation rules further includes a fifth rule for propagating the object property definition for the first object property to a registry file that sets corresponding object property definitions in other documents.

17. The method of claim 10, wherein:

the layout further comprises a plurality of components, each component comprising a plurality of the objects;

each object having an associated identifier and an associated instance code;

the layout further comprises a plurality content groups, each content group comprising a plurality of the object identifiers that are used in a plurality of the components; and the step of retrieving the propagation rule for the first object property comprises the steps of, determining whether the first object property is a content property;

if the first object property is a content property, identifying a particular one of the content groups that is associated with the first object, and retrieving a propagation rule associated with the content group that is associated with the first object.

18. The method of claim 17, wherein:

the layout further comprises a plurality of components, each component comprising a plurality of the objects;

each object having an associated identifier and an associated instance code;

the layout further comprises a plurality format groups, each format group comprising a plurality of the object identifiers that are used in a plurality of the components; and the step of retrieving the propagation rule for the first object property comprises the steps of, determining whether the first object property is a format property;

if the first object property is a format property, identifying a particular one of the format groups that is associated with the first object, and retrieving a propagation rule associated with the format group that is associated with the first object.

19. A computer-readable medium having computer-executable instructions for implementing a desktop publishing software program comprising:

a plurality of predefined layouts;

each layout comprising a predefined set of objects, each object having a set of object properties for defining a visible element of a desktop publishing document;

each layout further comprising a plurality of components, each component comprising a plurality of the objects;

each object having an associated identifier and an associated instance code;

the layout further comprises a plurality of groups including objects identifiers that occur in a plurality of the components; and the propagation rule for the first object property is selected from a group of propagation rules including, a first rule for no propagation of the object property definition for the first object property, a second rule for propagating the object property definition for the first object property to objects in the same component whose object identifiers belong to the same group, a third rule for propagating the object property definition for the first object property to objects in the same document whose object identifiers belong to the same group, and a fourth rule for propagating the object property definition for the first object property to objects with the same identifiers and the same instance codes in the document.

20. The computer-readable medium of claim 19, wherein the group of propagation rules further includes a fifth rule for propagating the object property definition to a registry file that sets corresponding object property definitions in other documents.

* * * * *